(12) United States Patent
Suzuki

(10) Patent No.: US 7,286,211 B2
(45) Date of Patent: Oct. 23, 2007

(54) METHODS AND DEVICES FOR MEASURING FUNDAMENTAL DATA OF LENSES

(75) Inventor: Toshiyuki Suzuki, Aichi (JP)

(73) Assignee: Tomey Corporation, Nagoya Aichi (JP)

( * ) Notice: Subject to any disclaimer, the term of this patent is extended or adjusted under 35 U.S.C. 154(b) by 467 days.

(21) Appl. No.: 10/824,356

(22) Filed: Apr. 15, 2004

(65) Prior Publication Data

US 2004/0207834 A1 Oct. 21, 2004

(30) Foreign Application Priority Data

Apr. 17, 2003 (JP) ............... 2003-112431

(51) Int. Cl.
*G01B 9/00* (2006.01)
(52) U.S. Cl. .................... 356/124
(58) Field of Classification Search ............... 356/124, 356/432
See application file for complete search history.

(56) References Cited

U.S. PATENT DOCUMENTS

| 5,408,311 | A |   | 4/1995 | Suzuki |
| 5,432,596 | A |   | 7/1995 | Hayashi |
| 5,576,827 | A | * | 11/1996 | Strickland et al. ......... 356/336 |
| 5,742,381 | A |   | 4/1998 | Ueno |
| 5,760,889 | A | * | 6/1998 | Manning .................... 356/124 |

FOREIGN PATENT DOCUMENTS

| JP | 2-186235 A | 7/1990 |
| JP | 3-18738 A | 1/1991 |
| JP | 5-196545 A | 8/1993 |
| JP | 8-278226 A | 10/1996 |
| JP | P2000-131190 A | 5/2000 |
| JP | 2002-48673 A | 2/2002 |

OTHER PUBLICATIONS

Kuppuswamy Venkatesan Sriram et al., "Talbot Interferometry in Noncollimated Illumination for Curvature and Focal Length Measurements" Applied Optics, OSA, Optical Society of America, Washington, DC, vol. 31, No. 1, Jan. 1, 1992, pp. 75-79.

* cited by examiner

*Primary Examiner*—Gregory J. Toatley, Jr.
*Assistant Examiner*—Kara Geisel
(74) *Attorney, Agent, or Firm*—Birch, Stewart, Kolasch & Birch, LLP

(57) ABSTRACT

A measurement device may illuminate lens 10 to be inspected with light at a plurality of different angles of incidence. The transmitted light that passes through lens 10 may be preferably detected by light detecting means 36. When light detecting means 36 detects the light, it outputs an electrical signal. Control unit 54 may (1) align light source 22 in the predetermined position and turns it on and (2) calculate the degree of refraction of the transmitted light that passes through lens 10, based upon the electrical signal output from light detecting means 36. Then, control unit 54 may further (3) conduct illumination at a plurality of different angles of incidence and obtain a plurality of "angle of incidence—degree of refraction" relationships from the degree of refraction calculated for each angle of incidence, and (4) calculate the fundamental data of lens 10 by using the plurality of "angle of incidence—degree of refraction" relationships.

12 Claims, 12 Drawing Sheets

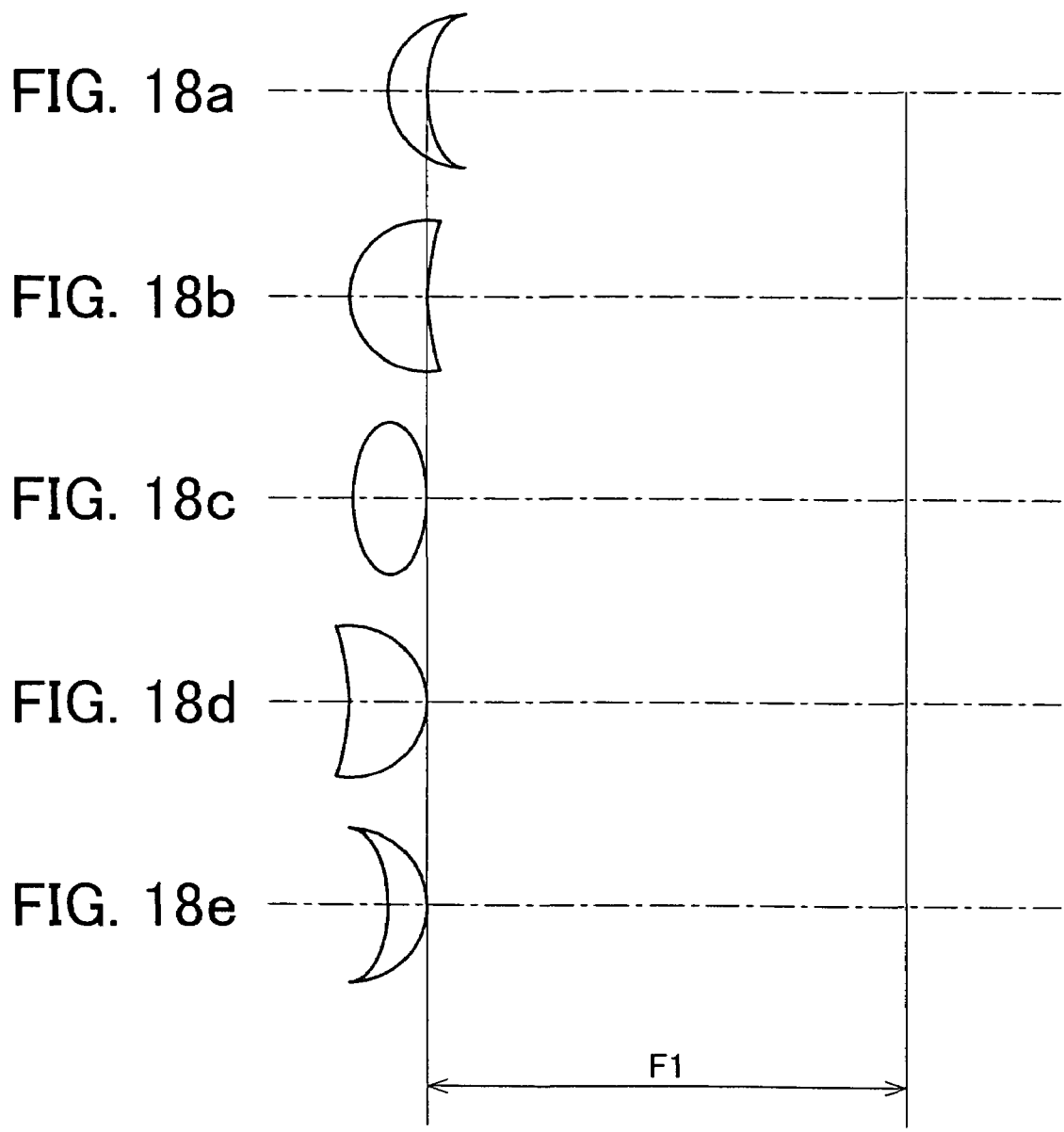

METHODS AND DEVICES FOR MEASURING FUNDAMENTAL DATA OF LENSES

CROSS REFERENCE

This application claims priority to Japanese patent application number 2003-112431, filed Apr. 17, 2003, the contents of which are hereby incorporated by reference as if fully set forth herein.

BACKGROUND OF THE INVENTION

1. Field of the Invention

The present invention relates to methods and devices for measuring fundamental data of lenses for vision correction, such as eyeglass lenses or contact lenses, and general optical lenses. According to the present specification, the "fundamental data" means data relating to lens shape or lens material, which determine the optical properties (e.g., focal distance, refractive power) of the lens. Therefore, the fundamental data include data relating to the surface shape of the lens and the refractive index of the lens.

2. Description of the Related Art

Japanese Laid-open Patent Publication No. 5-231985 describes a lens meter for measuring the refractive power (i.e., focal distance) of a lens. This known lens meter has a lens stand. The lens to be inspected is placed on the lens stand and illuminated with a parallel luminous flux, and its refractive power is calculated by measuring the focal position after the light has passed through the lens.

SUMMARY OF THE INVENTION

However, the shapes and material properties of lenses used for vision correction or optical devices have recently diversified and a demand has arisen for measuring not only refractive power, but also lens shape and material properties (e.g., refractive index). This is because, as shown in FIGS. 18a-18e for example, even lenses of the same refractive power (i.e., focal distance F1) can be of absolutely different shapes. Furthermore, in the progressive multifocal lenses used for correcting presbyopia, the far portion and near portion are connected by a progressive zone portion resulting in a complex aspherical surface. For this reason, the far portion and near portion cannot be easily distinguished, thus creating a demand for measuring the lens shape with the object of distinguishing the far portion and near portion. Although the conventional technology has been able to measure the refractive power of lenses, it has not been able to measure the shape or material properties of lenses.

It is, accordingly, one object of the present teachings to provide methods and devices for measuring fundamental data relating to lens shape and lens material properties.

In one aspect of the present teachings, a lens to be inspected may be illuminated with light at a predetermined angle of incidence, and degree of refraction of the transmitted light that passes through the lens may be measured. The "degree of refraction" as referred to herein means the degree to which the light beam is bent by the refractive action of the lens (i.e., the degree to which the light beam is refracted by the lens). Therefore, for example, the refractive power and focal distance, which are lens constants, can be measured as indexes (i.e., physical parameters) representing the "degree of refraction". Measurement of the degree of refraction may be conducted for each illumination with light at a plurality of different angles of incidence, and a plurality of "angle of incidence—degree of refraction" relationships are thus obtained. Fundamental data of the lens can be calculated based upon the plurality of obtained "angle of incidence—degree of refraction" relationships.

An example of the method for calculating fundamental data of a lens from the plurality of obtained "angle of incidence—degree of refraction" relationships will be briefly explained below. FIG. 1 schematically shows an example of a lens. In FIG. 1, the curvature radius of the front surface $S_1$ of lens 10 is denoted by $r_1$, the curvature radius of the rear surface $S_2$ is denoted by $r_2$, and the thickness of lens 10 is denoted by t. The refractive index of lens 10 is denoted by n. Generally, when the thickness t of lens 10 cannot be ignored, the front focal distance $f_1$ and focal distance f assume different values and $f=f_1+O_1H_1$. Point $H_1$ is a principal point on the front surface $S_1$ side of lens 10, and point $O_1$ is the intersection point of the front surface $S_1$ and the optical axis. Similarly, the rear focal distance $f_2$ and focal distance f assume different values and $f=f_2+O_2H_2$. Point $H_2$ is a principal point on the rear surface $S_2$ side of lens 10, and point $O_2$ is the intersection point of the rear surface $S_2$ and the optical axis.

The curvature radii $r_1$, $r_2$ specifying the lens shape, and the refractive index n specifying the lens material properties can be calculated from the focal distance f, front and rear focal distances $f_1$ and $f_2$, and thickness t. Furthermore, the front focal distance $f_1$ and rear focal distance $f_2$ can be measured by the conventional technology. Therefore, if $O_1H_1$, $H_1H_2$, and $O_2H_2$ can be calculated, then it will be possible to calculate the focal distance f and the thickness t, and to then calculate the curvature radii $r_1$, $r_2$ and the refractive index n using the calculated values.

FIG. 2 schematically shows the geometric relationship between the incident light and the transmitted light. As shown in FIG. 2, lens 10 is illuminated with light from a light source disposed at point $F_1'$ on the front surface $S_1$ side of lens 10, and the focal point of the transmitted light outgoing from the measurement reference position P on the surface S to be inspected (i.e., the rear surface $S_2$ of lens 10) becomes point $F_2'$. In FIG. 2, $O_1H_1$ is represented by a, $H_1H_2$ by b, and $O_2H_2$ by c. If an assumption is made that the surface S has a large curvature radius $r_2$ and is almost perpendicular to the optical axis, then the intersection point of the straight line $F_1'F_2'$ (i.e., optical axis) and the perpendicular line drawn from the measurement reference position P to straight line $F_1'F_2'$ can be considered as point $O_2$. Thus, the distance from the principal point $H_1$ to point $F_1'$ (i.e., the object point distance) will be L−b−c (where $F_1'O_2=L$). Further, the image point distance Δ will be $F_2'O_2+c$. Because the sum of the inverse number of the object point distance and the inverse number of the image point distance is the inverse number of the focal distance f, the following equation is valid:

$$1/(L-b-c)+1/(F_2'O_2+c)=1/f \quad (1)$$

As shown in FIG. 1, because the focal distance f is obtained by adding the distance $O_2H_2$ (=c) to the rear focal distance $f_2$, the equation (1) can be transformed into the following equation.

$$1/(L-b-c)+1/(F_2'O_2+c)=1/(f_2+c) \quad (2)$$

Here, the distance $F_1'O_2$ (i.e., L) from the light source (i.e., point $F_1'$) to the surface S can be predetermined. The distance $F_2'O_2$ (i.e., the degree of refraction of lens 10) from the focal point $F_2'$ to the surface S can also be measured. Therefore, formula (2) is an equation containing b, c, and $f_2$ as variables. Because one such equation (2) can be derived from the "angle of incidence—degree of refraction" relationship, a system of equations can be obtained by measuring the degree of refraction for a plurality of angles of incidence. Then, the variables b, c, and $f_2$ can be obtained by solving the system of equations. Thus, the degree of refraction relating to at least three angles of incidence may be measured to find the variables b, c, and $f_2$. Similarly, if lens 10 is reversed and illuminated, from the rear surface $S_2$ side of lens 10, then a, b, and f, (front focal distance) can be calculated. As a result, all the parameters specifying the shape of lens 10 and the parameter specifying the material properties of lens 10 can be calculated.

Both the lens shape and the lens material properties can be specified apart from the aforementioned parameters, and which parameters are to be used can be freely determined by the user. Furthermore, it is not necessary to calculate all the aforementioned parameters using the method of the present teachings, and only the necessary parameters may be calculated according to the object. The physical parameter which is measured as the degree of refraction of the transmitted light is not limited to the above-described distance $F_2'O_2$, and the angle $\beta$ formed by the transmitted light and optical axis or the ratio $\tan \beta$ $(=h/F_2'O_2)$, which is determined by the angle $\beta$ may also be measured. Here, the aforesaid h is a set value unique to each device for measuring the degree of refraction, such as a lens meter, and is a known value.

In one embodiment of the present teachings, it is preferred that the degree of refraction be measured when one side of the lens to be inspected is illuminated with light at three or more different angles of incidence and that the fundamental data of the lens be calculated based upon the three "angle of incidence—degree of refraction" relationships obtained by these measurements. The fundamental data relating to one surface of the lens can be calculated by obtaining three or more "angle of incidence—degree of refraction" relationships for this surface of the lens.

In another embodiment of the present teachings, the thickness of the lens may be preferably measured by measurement device (e.g., micrometer). If the thickness of the lens is measured, one variable of the three variables a, b, and c can be eliminated. Therefore, the degree of refraction is measured by illuminating each of the two surfaces of the lens with light at two or more different angles of incidence. As a result, at least two "angle of incidence—degree of refraction" relationships may be obtained for each surface of the lens. Next, the fundamental data of the lens may then be calculated based upon the obtained four "angle of incidence—degree of refraction" relationships and the measured thickness of the lens.

In another embodiment of the present teachings, one surface of the lens to be inspected is illuminated at three different angles of incidence, and each of the respective degrees of refraction is measured. The three parameters (e.g., the aforesaid b, c, and $f_2$) for specifying the fundamental data of the lens are calculated based upon the three "angle of incidence—degree of refraction" relationships obtained by the measurements. Those parameters are calculated for each of a plurality of measurement points Pi (i=1–n) on the surface S to be inspected. The shape (e.g., curvature radii $r_{1i}$, $r_{2i}$) of each measurement point Pi may then be displayed based upon changes with respect to the shape of the reference point $P_1$. According to this embodiment, the difference in shape of various measurement points can be found by illuminating only one of the surfaces of the lens.

In another aspect of the present teachings, the present teachings provide a measurement device for measuring the fundamental data of the lens. The measurement device may comprise a light source and a light detecting unit for detecting the light. The measurement device may also include a lens stand which is disposed between the light source and the light detecting unit. The lens to be inspected can be set on the lens stand. When the lens is set on the lens stand, the light emitted from the light source passes through the lens and is detected by the light detecting unit. The light detecting unit may output a signal according to the intensity of the detected light. Further, the measurement device may preferably include means for changing the optical distance from the light source to the lens (i.e., the lens stand). Changing the optical distance from the light source to the lens makes it possible to illuminate the lens with light from the light source at various angles of incidence.

The measurement device may further comprise a control unit (e.g., microcomputer, microprocessor or processor). The control unit may receive the signal output from the light detecting unit. When the lens is illuminated with light from the light source at the predetermined angle of incidence, the control unit may also calculate the degree of refraction of the transmitted light that passes through the lens based upon the signal output from the light detecting unit and obtains the "angle of incidence—degree of refraction" relationship. The control unit may preferably calculate the fundamental data of the lens based upon the plurality of the obtained "angle of incidence—degree of refraction" relationships.

In another aspect of the present teachings, the measurement device may further include a display unit for displaying the fundamental data calculated by the control unit. Various types of displays can be used as the display unit. Furthermore, it is not necessary to display all the fundamental data calculated by the control unit. For example, part of the calculated fundamental data may be selectively displayed by respective operations of the user.

In another aspect of the present teachings, the measurement device may have a condensing lens which is disposed between the light source and the lens stand. The measurement device may further comprise means for changing the position of the condensing lens in the direction of approaching the lens stand or withdrawing therefrom. As a result, the optical distance between the light source and the lens can be changed and the light will enter the lens at different angles of incidence. Alternatively, the measurement device may also include a plurality of condensing lenses with different refractive powers that are disposed between the light source and the lens stand. Then, any of the plurality of condensing lenses may be selectively disposed between the light source and the lens. According to this configuration, too, the optical distance between the light source and the lens can be changed.

For example, a method for moving the light source in the direction of approaching the lens stand or withdrawing therefrom may be used as the method for illuminating the lens at different angles of incidence. With this configuration, too, the optical distance between the light source and the lens is changed, causing the light to enter the lens at different angles of incidence. Alternatively, the respective light sources may be disposed in a plurality of positions at different optical distances from the lens and the lens may be illuminated with light from any of those light sources.

Further, it is preferred that the lens in the above-described measurement device be illuminated at no less than two of the three different types of illumination angles: divergent light, parallel light, and condensing light. In this case, it is preferred that parallel light be included in the types of light illuminating the lens. Including the parallel light makes it possible to directly measure the front focal distance $f_1$ or the rear focal distance $f_2$. As a result, the operations for calculating the fundamental data can be conducted in an easy manner.

These aspects and features may be utilized singularly or, in combination, in order to make improved measurement device. In addition, other objects, features and advantages of the present teachings will be readily understood after reading the following detailed description together with the accompanying drawings and claims. Of course, the additional features and aspects disclosed herein also may be utilized singularly or, in combination with the above-described aspect and features.

BRIEF DESCRIPTION OF THE DRAWINGS

FIGS. 18a-18e schematically show a set of a plurality of lenses with identical refractive power but different lens shapes.

DETAILED DESCRIPTION OF THE INVENTION

Detailed Representative Embodiment

Figure 3:
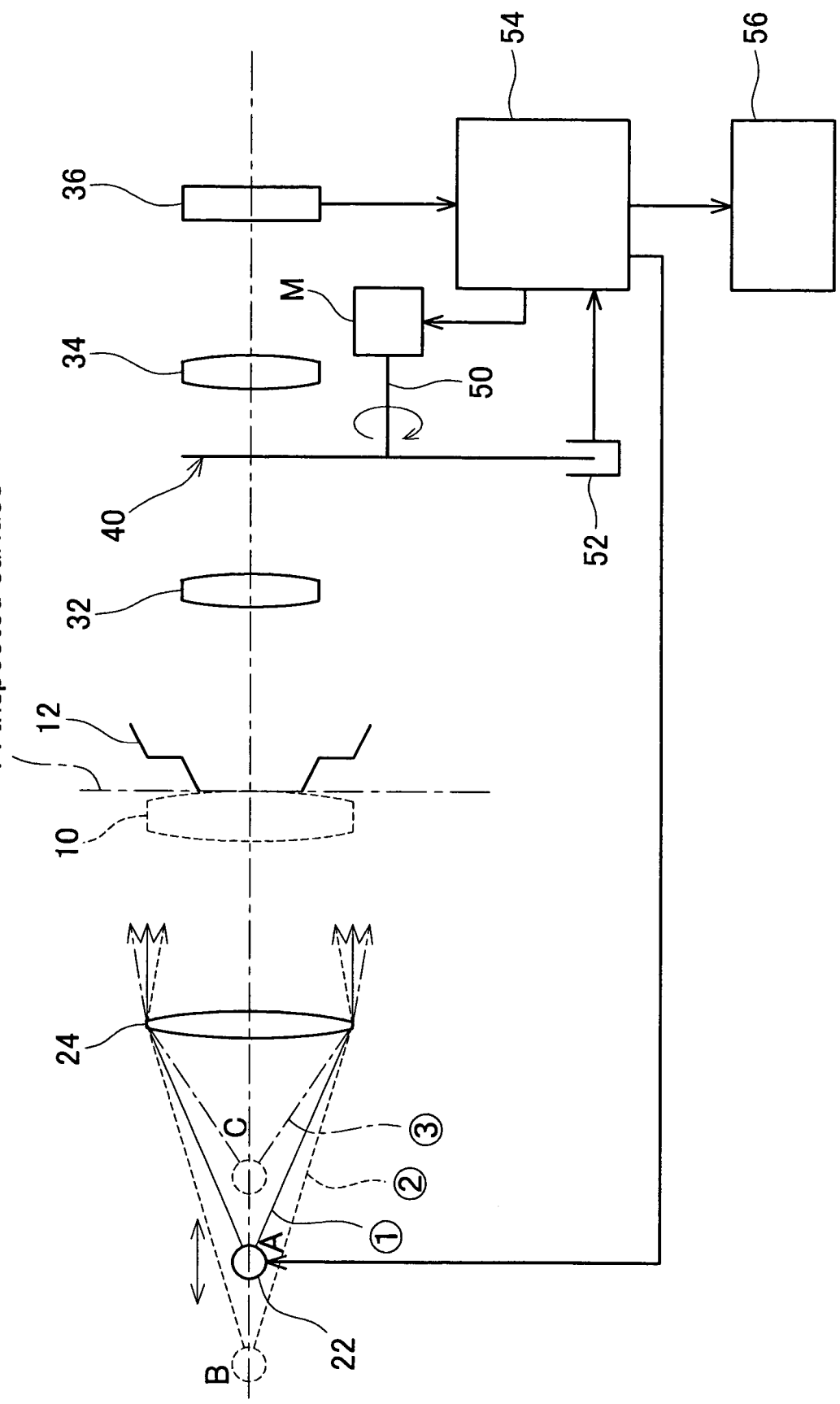
FIG. 3 is a block diagram showing the configuration of a measurement device according to a representative embodiment of the present teachings.

A measurement device according to a representative embodiment of the present teachings will be explained below with reference to the drawings. FIG. 3 schematically shows a configuration of the measurement device. As shown in FIG. 3, the measurement device may have lens stand 12 (e.g., nose piece) on which lens 10 to be inspected can be placed. The measurement device may further include light source 22 and light detecting element 36. Light source 22 may be disposed on one side of lens stand 12, and light detecting element 36 may be disposed on the other side. Light emitted from light source 22 passes through lens 10 and is detected by light detecting element 36.

Light source 22 may comprise an light-emitting diode. Condensing lens 24 may be disposed in the optical path between light source 22 and lens 10. The light emitted from light source 22 is projected onto lens 10 via condensing lens 24. Light source 22 may move along the optical axis and is positioned at points A, B, and C shown in FIG. 3. When light source 22 is positioned at point A, lens 10 is illuminated with a parallel luminous flux (i.e., ① in FIG. 3); when light source 22 is positioned at point B, lens 10 is illuminated with a condensed luminous flux (i.e., ② in FIG. 3); and when light source 22 is positioned at point C, lens 10 is illuminated with a divergent luminous flux (i.e., ③ in FIG. 3).

Figure 6:
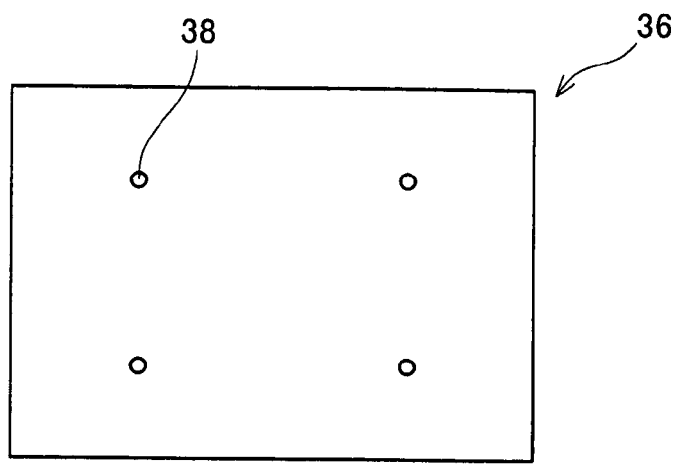
FIG. 6 is a front view showing a photoelectric conversion element disposed on the light-receiving surface of the light-receiving element.

As shown in FIG. 6, light detecting element 36 may have photoelectric conversion element 36. Photoelectric conversion element 38 may be disposed on the light-receiving surface of light detecting element 36. Photoelectric conversion element 38 is a sensor that outputs electric signals when photoelectric conversion element 38 detects a light. The electric signals output from photoelectric conversion element 38 are input into control unit 54.

Figure 4:
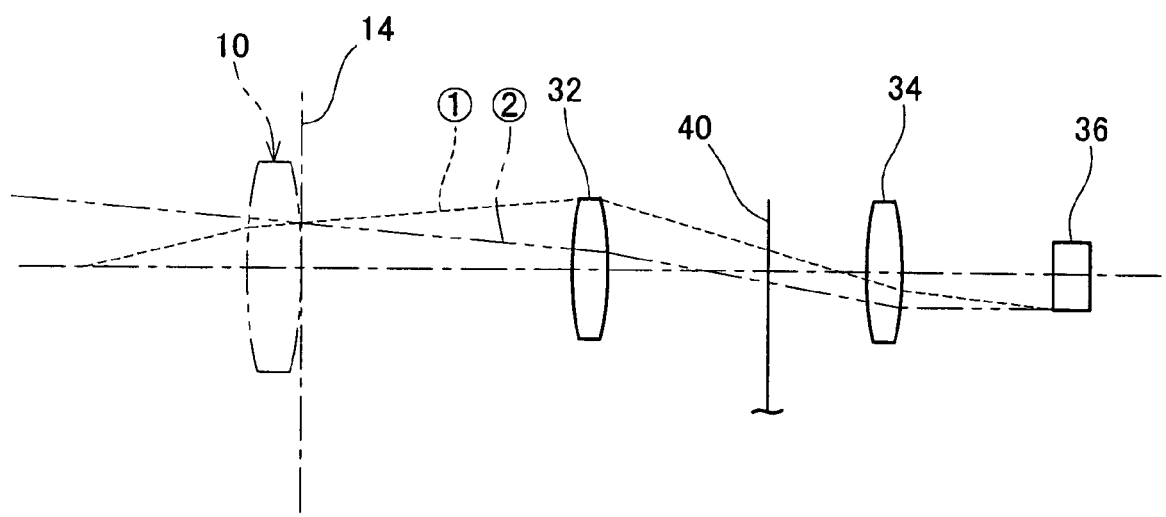
FIG. 4 is a diagram schematically showing the functions of the condensing lens and the image-forming lens disposed on the light-receiving element side of the measurement device shown in FIG. 3.

As shown in FIG. 3, the measurement device may also include condensing lens 32 and image-forming lens which are disposed with a predetermined distance therebetween on the optical path between light detecting element 36 and lens 10. The transmitted light that passes through lens 10 is condensed by condensing lens 32, and then guided to light-receiving surface of light detecting element 36 by image-forming lens 34. The light-receiving surface of light detecting element 36 and lens 10 are conjugated by condensing lens 32 and image-forming lens 34. That is, as shown in FIG. 4, the light (e.g., ① or ② in FIG. 4) entering a certain position of lens 10 is guided to a certain position on the light-receiving surface of light detecting element 36, regardless of the refraction power of lens 10. Therefore, the light outgoing from a certain position corresponding to lens 10 enters each photoelectric conversion element 38 of light detecting element 36. Thus, in the measurement device of the representative embodiment, only the parameters (e.g., thickness, refractive index, curvature radius) of each point corresponding to photoelectric conversion elements 38 can be measured.

The measurement device may further comprise rotating plate 40 which is disposed between condensing lens 32 and image-forming lens 34. Rotating plate 40 may have rotary shaft 50 which is fixed in the center of rotating plate 40. Rotary shaft 50 may be connected to an output shaft of motor M. Therefore, when motor M rotates, rotary shaft 50 also rotates and rotating plate 40 rotates accordingly.

Figure 5:
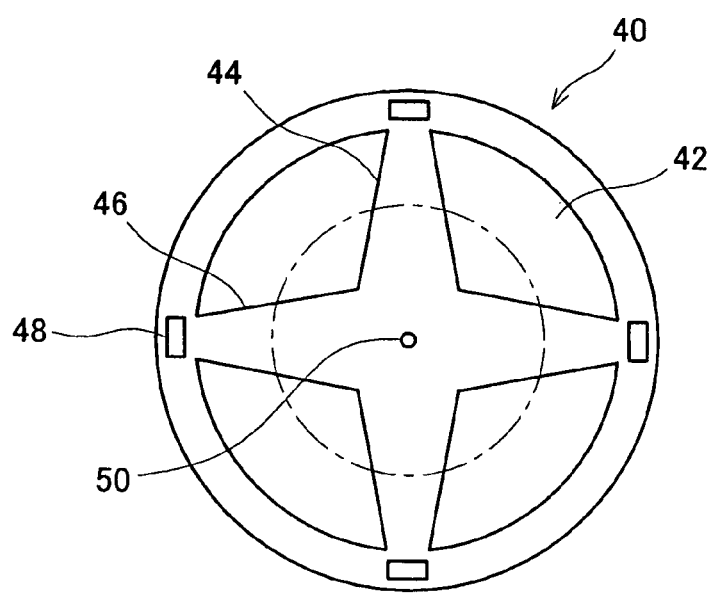
FIG. 5 is a front view showing the rotation plate disposed between the condensing lens and the image-forming lens.
Figure 7:
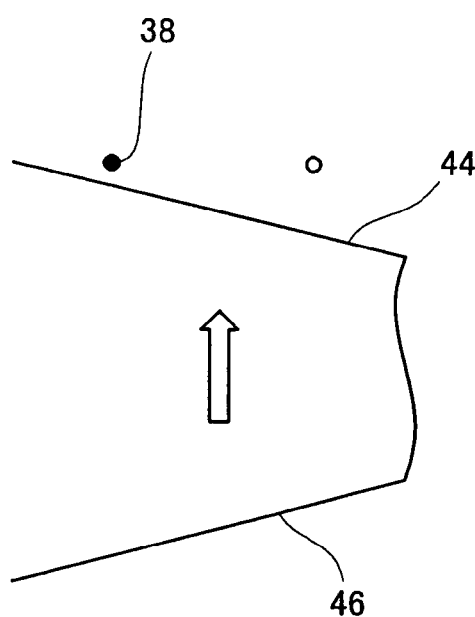
FIG. 7 schematically shows the state in which the rotation plate blocks the light entering the photoelectric conversion element.
Figure 8:
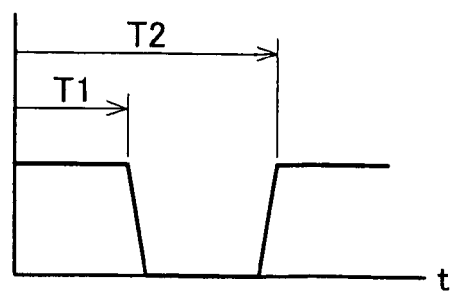
FIG. 8 schematically shows the electric signal output from the photoelectric conversion element of the light-receiving element.

As shown in FIG. 5, rotating plate 40 may have a round shape, and apertures 42 may be defined within rotating plate 40 with 90° spacing in the circumferential direction. Those apertures 42 are arranged so as to assume positions crossing the optical path. As a result, when rotating plate 40 rotates, the luminous flux that passes through lens 10 is periodically blocked by rotating plate 40. Therefore, the light entering photoelectric conversion element 38 is also periodically blocked according to the rotation of rotating plate 40, as shown in FIG. 7, and the electric signal output from photoelectric conversion element 38 changes periodically, as shown in FIG. 8.

If the intervals from an instant of time corresponding to a certain reference position, to the blocking and opening of the path for the incident light to enter photoelectric conversion element 38 are denoted by T1 and T2, respectively, then a position on the rotation plane of rotating plate 40 where the light entering photoelectric conversion element 38 is interrupted, can be calculated from time intervals T1 and T2. Methods for calculating the position based upon time intervals T1 and T2 are known (e.g., Japanese Laid open Patent Publication No. 5-231985) and thus, a detailed explanation will be omitted.

As is clear from the above, the light outgoing from the predetermined position of lens 10 normally enters a predetermined position on the light-receiving surface of light detecting element 36, but the position on rotating plate 40 in which the light outgoing from the predetermined position of lens 10 is blocked differs, for example, depending on the refraction power of lens 10 (see FIG. 4). In order to specify the position in which the light outgoing from lens 10 is blocked by rotating plate 40, slits 48 may be defined on the outer periphery of rotating plate 40, as shown in FIG. 5. Rotational position detecting sensor 52 may be disposed in the corresponding position on the rotation trajectory of slits 48. Rotational position detecting sensor 52 may comprise a light source and a light-receiving element. The light source and the light-receiving element may be disposed so as to sandwich rotating plate 40. When rotational position detecting sensor 52 detects slits 48, the reference rotational position signal of rotating plate 40 is output from rotational position detecting sensor 52. The reference rotational position signal output from rotational position detecting sensor 52 is input into control unit 54. Control unit 54 can specify the position at which the light outgoing from the predetermined position of lens 10 enters the rotation plane of rotating plate 40 by the relationship of the time intervals T1 and T2 (i.e., the time intervals to the blocking and opening of the incident light after the input of the reference rotational position signal) of the electric signals output from photoelectric conversion element 38.

Control unit 54 may control the position of light source 22 and the rotation speed of rotating plate 40, and calculate the refractive power of lens 10 in each position based upon the electric signal output from light detecting element 36 (i.e., photoelectric conversion element 38) and the reference rotational position signal output from rotational position detecting sensor 52. Methods for calculating the refractive power based upon the electric signal output from light detecting element 36 and the reference rotational position signal are known (e.g., Japanese Laid open Patent Publication No. 5-231985) and thus, a detailed explanation will be omitted.

Figure 1:
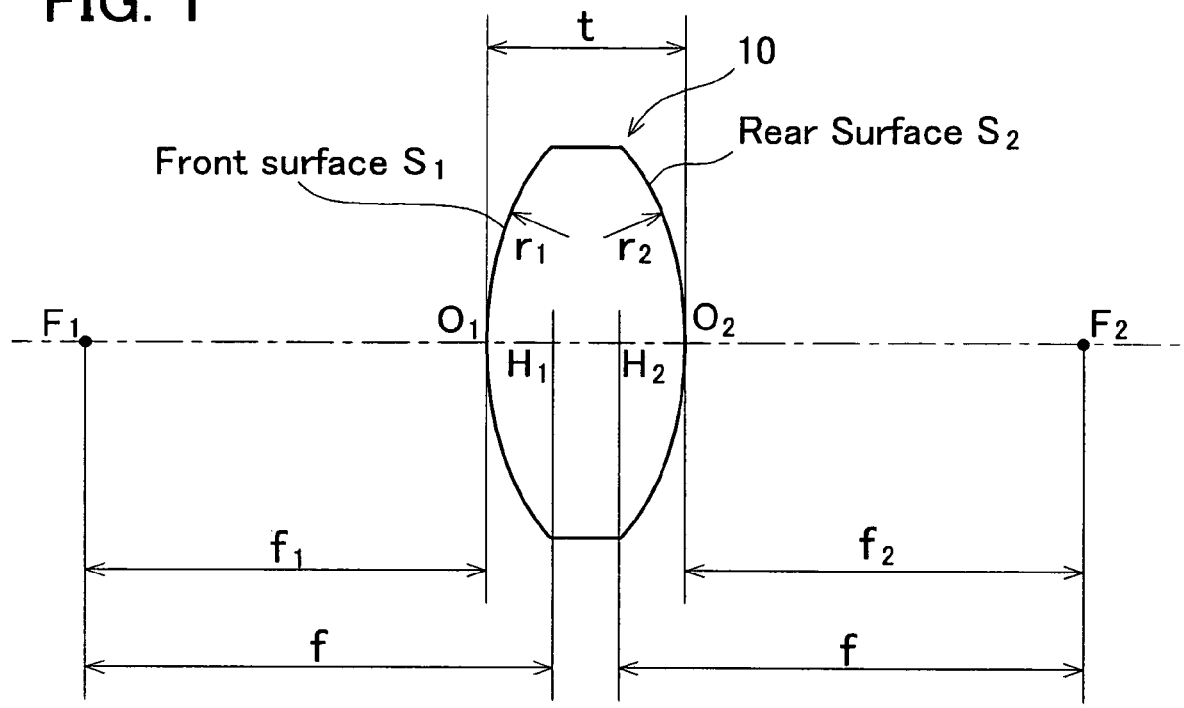
FIG. 1 is a diagram schematically showing an example of a lens to be inspected.
Figure 2:
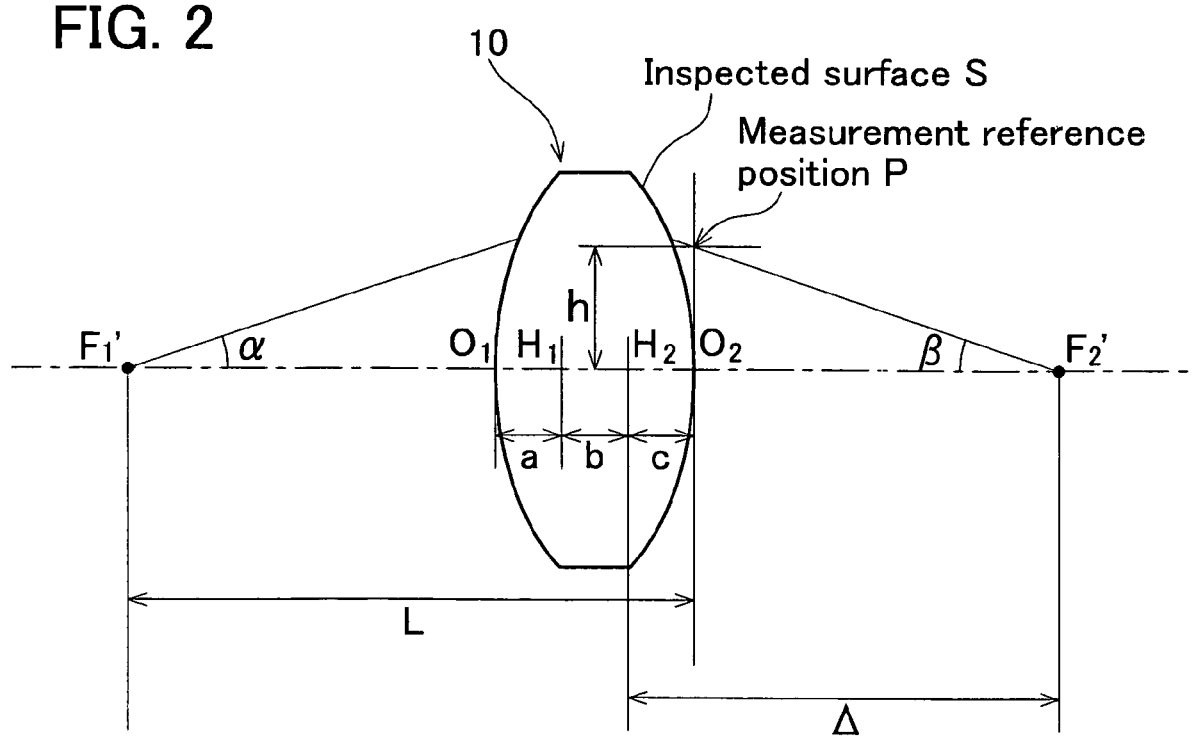
FIG. 2 is a diagram schematically showing the geometric relationship between the incident light and the transmitted light when the lens is illuminated with light at the predetermined angle of incidence.

Further, control unit 54 may also calculate the front surface curvature radius $r_1$ and rear surface curvature radius $r_2$ of lens 10, the thickness t of lens 10, and the refractive index n of lens 10 based upon three "angle of incidence—degree of refraction" relationships obtained by calculating the respective refractive powers for the transmitted light of the light entering at three angles of incidence. Thus, as shown in FIG. 2, when the degree of refraction is obtained for one angle of incidence, one above-mentioned equation (2) can be obtained. Therefore, control unit 54 may calculate the variables b, c, and $f_2$ (or a, b, and $f_1$) (the meaning of the symbols is identical to that explained with reference to FIG. 2) by solving the system of the three equations: equation (2) obtained from the degree of refraction measured when light source 22 is positioned at point A, equation (2) obtained from the degree of refraction measured when light source 22 is positioned at point B, and equation (2) obtained from the degree of refraction measured when light source 22 is positioned at point C. Further, lens 10 is reversed and placed on lens stand 12, and the variables a, b, and $f_1$ (or b, c, and $f_2$) are calculated by conducting similar processing. If the variables a, b, c, $f_1$, and $f_2$ are thus calculated, then the front surface curvature radius $r_1$ and the rear surface curvature radius $r_2$ of lens 10, the thickness t of lens 10, and the refractive index n of lens 10 can be calculated by the following formulas:

$$t = a+b+c,$$

$$n = t/(f-(f_1 \cdot f_2/f)) \text{ (where } f=f_1+a=f_2+c)$$

$$r_1 = (n-1) \cdot t/n \cdot (1-f_2/f)$$

$$r_2 = (n-1) \cdot t/n \cdot (f_1/f-1)$$

The calculated front surface curvature radius $r_1$, the rear surface curvature radius $r_2$, the thickness t, and the refractive index n may be preferably displayed on display unit 56. Control unit 54 may also displays on display unit 56 the focusing distance f ($=f_1+a=f_2+c$), refractive power D ($=1000/f$), front refractive power D1 ($=1000/f_1$), and rear refractive power D2 ($=1000/f_2$) determined from a, b, c, $f_1$, and $f_2$. Control unit 54 may comprise a microprocessor or microcomputer that includes, e.g., central processing unit (CPU), read only memory (ROM), random access memory (RAM) and input/output port (I/O).

Figure 9:
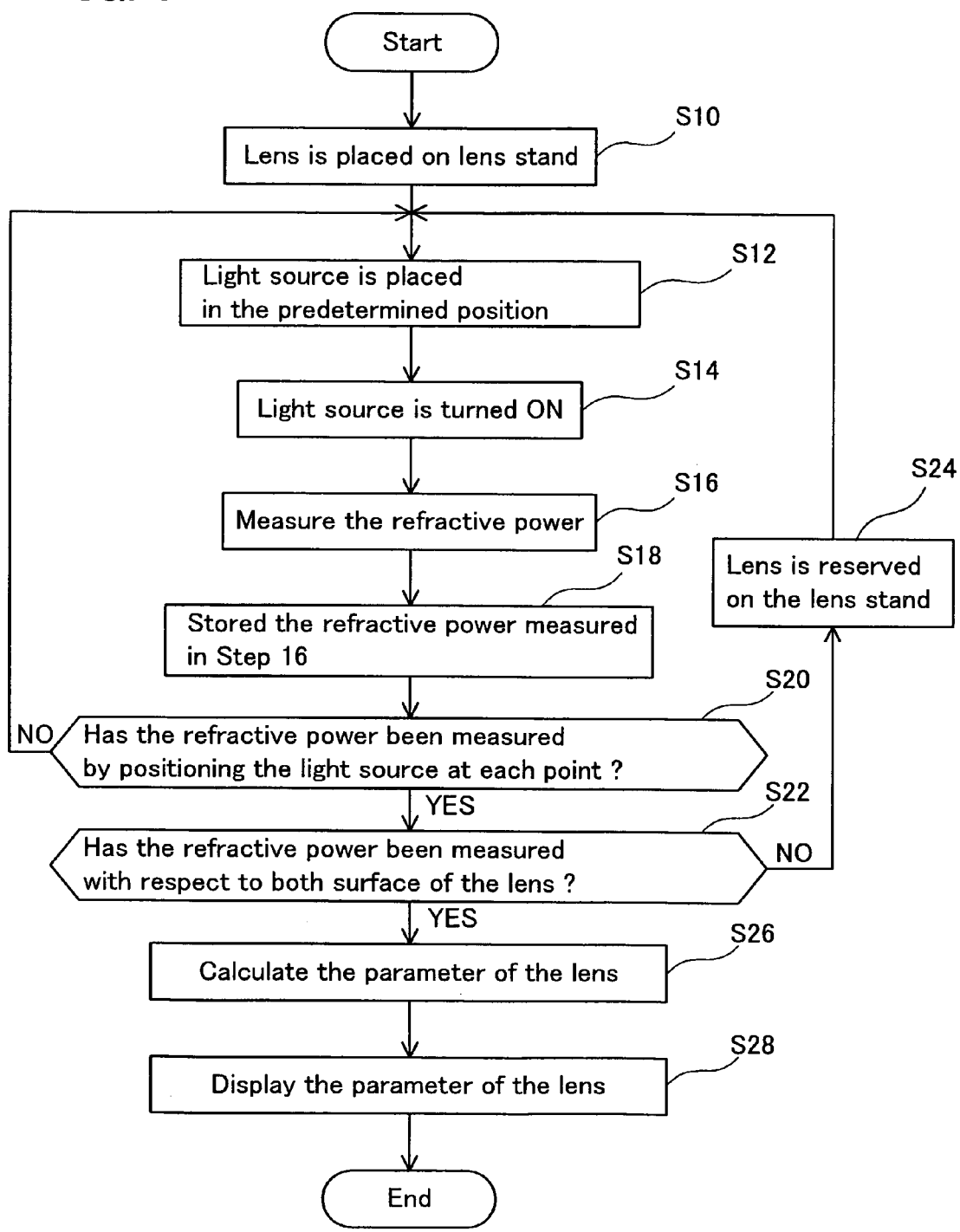
FIG. 9 is a flow chart showing a representative process for measuring the fundamental data of the lens.

The representative operation of the measurement device will now be explained with reference to the flowchart of FIG. 9. First, lens 10 to be inspected is placed on lens stand 12 (step S10). For example, lens 10 is placed so that the front surface of lens 10 faces the light source 22. When lens 10 is placed on lens stand 12, control unit 54 positions light source 22 in the predetermined position (step S12). That is, when the first measurement of refractive power is conducted with respect to one surface of lens 10, light source 22 is positioned at point B shown in FIG. 3; when the second measurement is conducted, light source 22 is positioned at point A shown in FIG. 3; and when the third measurement is conducted, light source 22 is positioned at point C in FIG. 3.

After light source 22 is positioned at the predetermined position, light source 22 is turned on (step S14), and the refractive power of the transmitted light that has passed through lens 10 is measured (step S16). That is, control unit 54 drives motor M, thereby rotating rotating plate 40 at the predetermined rotation speed, and measures the refractive power based upon the electric signal output from light detecting element 36 and the reference rotational position signal output from rotational position detecting sensor 52. Once the measurement of refractive power has been completed, the measured refractive power is stored in the memory (e.g., RAM of control unit 54) (step S18) and control unit 54 determines whether the refractive power has been measured by positioning the light source 22 at each position (step S20).

If the refractive power has not been measured by positioning light source 22 at each position ("NO" in step S20), the processing flow returns to step S12, and the processing is repeated from step S12. As a result, the refractive power corresponding to positioning light source 22 at each position of points A, B, and C is measured. On the other hand, when the refractive power has been measured by positioning light source 22 at each position ("YES" in step S20), the processing flow proceeds to step S22 and control unit 54 determines whether the refractive power has been measured with respect to both surfaces of lens 10.

If the refractive power has not been measured for both surfaces of lens 10 ("NO" in step S22), lens 10 is reversed on lens stand 12 (step S24), and the processing is then repeated from step S12. As a result, the refractive power is measured when the light enters both surfaces of lens 10 at three respective angles of incidence. Lens 10 may be reversed automatically by control unit 54 or manually by the user. When lens 10 is reversed manually by the user, the user enters an input to the effect that the lens was reversed from an input unit (e.g., keyboard); once control unit 54 receives this input, it can proceed to subsequent processing.

Conversely, when the refractive power has been measured for both surfaces of lens 10 ("YES" in step S22), control unit 54 computes the various parameters of lens 10 (i.e., thickness t, refractive index n, front surface curvature radius $r_1$, rear surface curvature radius $r_2$, focusing distance f, refractive power D, front refractive power D1, and rear refractive power D2) (step S26). The results of the computation obtained in step S26 are displayed on display unit 56 (step S28).

As is clear from the above, in the above illustrated representative embodiment, the shape data of the lens (e.g., thickness t, front surface curvature radius $r_1$, and rear surface curvature radius $r_2$), which could not be measured with the conventional technology, are measured and those data are displayed on display unit 56. Therefore, the lens shape of non-spherical lenses and progressive multifocal lenses can be determined. As a result, for example, the far portion, near portion and progressive portion of progressive multifocal lenses can be easily determined.

Further, in the above illustrated representative embodiment, data relating to the material of the lens (e.g., refractive index) are measured and displayed on display unit 56. Therefore, the lens material can be identified from data, such as the refractive index, that are displayed. Therefore, for example, when only one lens of a pair of eyeglasses is broken and needs to be replaced, the refractive index and thickness of the other lens of the eyeglasses can be measured and a replacement lens can be fabricated from the same material based upon the data obtained.

The above illustrated representative embodiment provides an example of the application of the present teaching. However, the present teachings include various changes and modifications of the above illustrated representative embodiment.

(1) First Modified Embodiment

In the above illustrated representative embodiment, the refractive power is measured by illuminating both surfaces of lens 10 with a light at three angles of incidence, and the fundamental data relating to lens 10 are calculated by solving a system of six equations that are obtained from the measurement results. However, the present teachings are not limited to this embodiment. For example, the thickness t of the lens to be inspected may be measured separately with a micrometer, and the refractive power may be measured with respect to two angles of incidence on both surfaces of the lens. That is, by measuring the thickness t of the lens, the variable b contained in the aforesaid formula (2) is represented by t−a−c. Therefore, a total of four variables, a, c, $f_1$, and $f_2$, are necessary in order to calculate the fundamental data relating to the lens, and a system of four equations is necessary to calculate those variables a, c, $f_1$, and $f_2$. For this reason, various parameters can be calculated by merely measuring the refractive power by illuminating one surface of the lens with light at two angles of incidence. Further, in the measurement device of such an embodiment, the measurement device may include a micrometer and the thickness t of the lens may be measured automatically by the micrometer. Alternatively, the thickness t of the lens may be measured manually and input into the measurement device.

Alternatively, the refractive power can be measured by illuminating only one surface of the lens with light at three angles of incidence and finding the variables b, c, and $f_2$ (or a, b, and $f_1$) by solving a system of three equations that were obtained from the measurement results. The remaining variable a (or c) may be found by measuring the thickness t of the lens and subtracting b+c (or a+b) from the thickness t. In this case, it is not necessary to reverse the lens and measurements can be conducted within a short time.

Further, it is also possible to measure the refractive power by illuminating only one surface of the lens with light at three angles of incidence and to directly determine the summary data relating to the lens shape by using the variables b, c, and $f_2$ (or a, b, and $f_1$) calculated by solving the system of three equations obtained from the measurement results. That is, if a known equation for finding three focal distances f, $f_1$, and $f_2$ is transformed using the curvature radii $r_1$, and $r_2$ of the lens, the thickness t of the lens, and the refractive index n, then the variables c, a, t, $r_1$, and $r_2$ can be represented by the following equations:

$$c=(n-1)\cdot t\cdot f/(n\cdot r_1)$$

$$a=-(n-1)\cdot t\cdot f/(n\cdot r_2)$$

$$t=n\cdot b/(n-1)$$

$$r_1=(b/c)\cdot f$$

$$r_2=b\cdot f\cdot(n-1)\cdot(c\cdot(n-1)-b)$$

$$(f=f_1+a=f_2+c)$$

These equations clearly demonstrate that if the variables b, c, and $f_2$ are determined by solving a system of three equations, then the parameters t (thickness), and $r_1$ and $r_2$ (curvature radii) representing the lens shape become functions that use the refractive index n as a variable.

Therefore, first, the respective parameters $t_i$, $r_{1i}$, and $r_{2i}$ (i=1–m) relating to a plurality of measurement points $P_i$ (i=1–m) on the surface to be inspected are determined as functions of the refractive index n, and then $t_i$, $r_{1i}$, and $r_{2i}$ are calculated for each measurement point $P_i$ by substituting the appropriate values into the refractive index n. The summary data relating to lens shape are determined from the $t_i$, $r_{1i}$, and $r_{2i}$ calculated for each measurement point $P_i$. For example, a reference shape ($t_1$, $r_{11}$, and $r_{21}$) is determined by selecting the measurement point $P_1$ as a reference point. Variations of the shape at each measurement point $P_i$ with respect to the shape at the reference point $P_1$ are then assessed by comparing the reference shape (t1, $r_{11}$, and $r_{21}$) with the shape ($t_i$, $r_{1i}$, and $r_{2i}$) in another measurement point $P_i$. Thus, a decision is made as to whether the thickness has increased or the curvature radius has become larger. As a result, it is possible to find, for example, a far portion, a near portion, and a progressive portion of a progressive lens (i.e., multifocal lens).

Figure 10A:
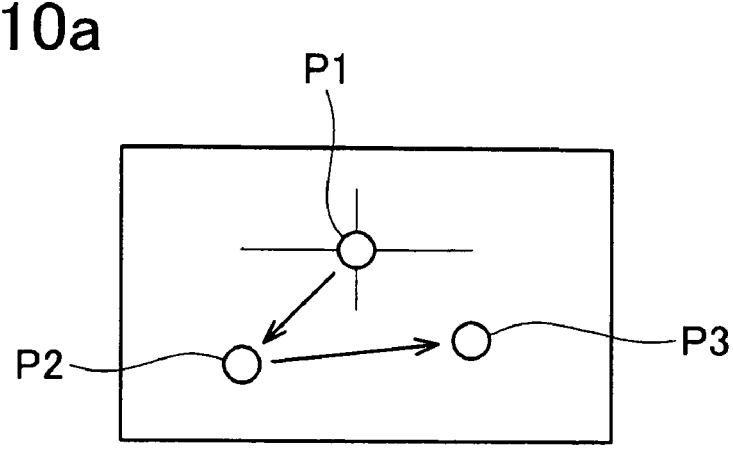
FIGS. 10a-10c schematically show examples of a display screen that is displayed on a display unit in the measurement device of another representative embodiment of the present teachings.
Figure 10B:
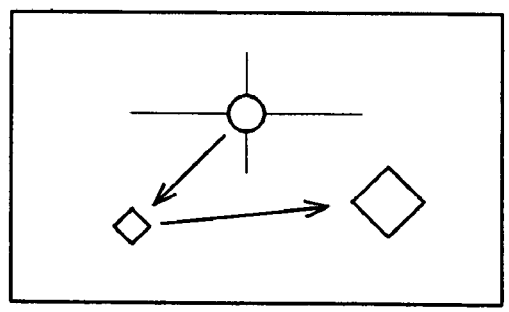
Figure 10C:
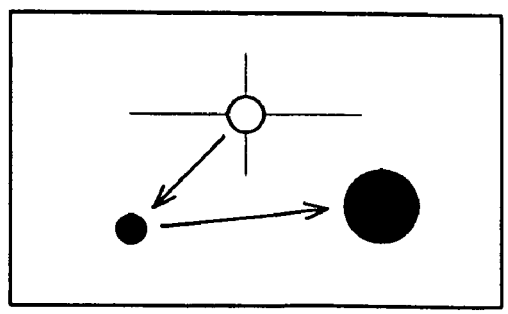

Further, when such a method is used, it is preferred that, for example, the refractive power D, thickness t, and curvature radii $r_1$ and $r_2$ relating to each measurement point could be selectively displayed on a display unit. For example, the refractive power at measurement points $P_1$, $P_2$, and $P_3$ can be displayed as shown in FIG. 10a, or the thickness t at measurement points $P_1$, $P_2$, and $P_3$ (as shown in FIG. 10b) or the curvature radius $r_1$ or $r_2$ (as shown in FIG. 10c) can be displayed according to the user's input. As a result, it is possible to visually comprehend the relative positions of measurement points $P_1$, $P_2$, and $P_3$, and the optical and shape characteristics at each measurement point $P_1$, $P_2$, and $P_3$. Furthermore, it is possible to determine which of the shape elements (e.g., thickness, front or rear curvature radii) brought about the changes in optical characteristics.

Figure 11:
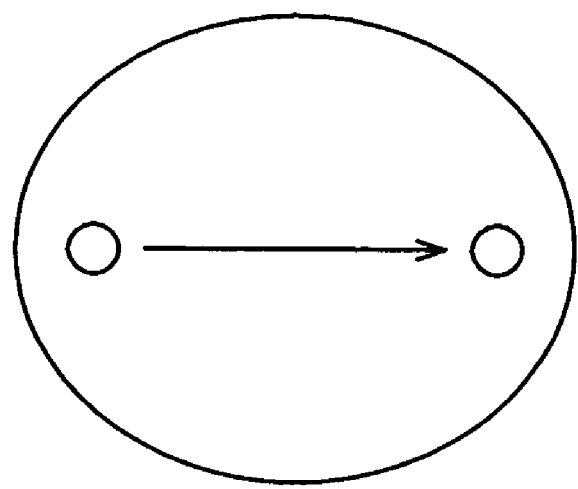
FIG. 11 schematically shows the positional relationship between the measurement point and the surface to be inspected when measurements are conducted by moving the measurement point in the horizontal direction with respect to the lens to be inspected.
Figure 12:
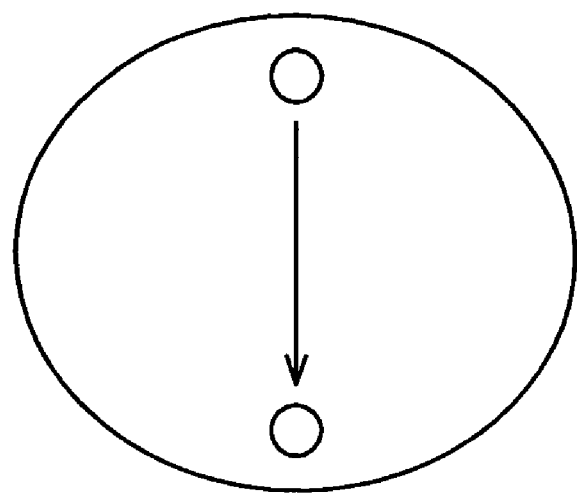
FIG. 12 schematically shows the positional relationship between the measurement point and the surface to be inspected when measurements are conducted by moving the measurement point in the vertical direction with respect to the lens to be inspected.
Figure 13:
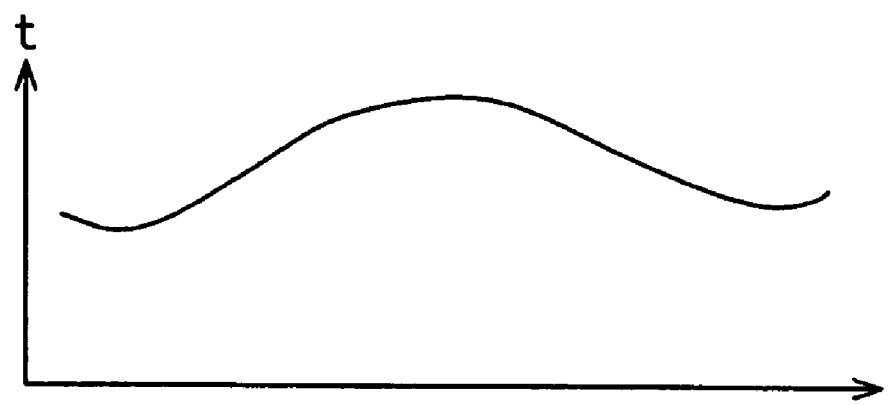
FIG. 13 schematically shows the relationship between the position and the thickness obtained when measurements are conducted by moving the measurement point as shown in FIG. 12.
Figure 14:
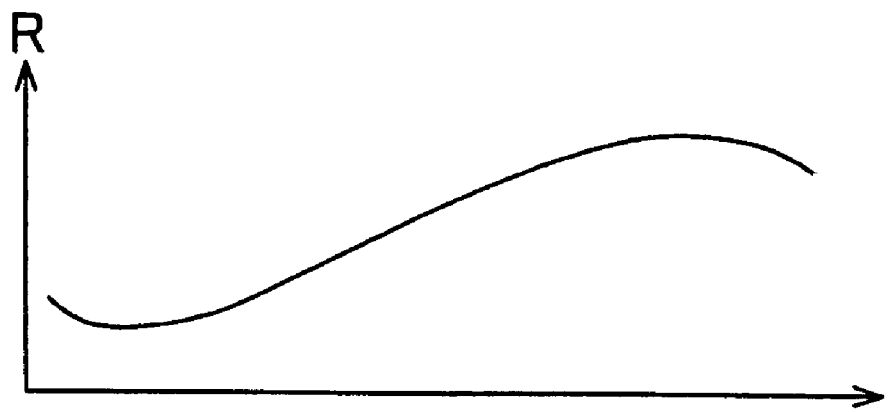
FIG. 14 schematically shows the relationship between the position and the curvature radius obtained when measurements are conducted by moving the measurement point as shown in FIG. 12.

Furthermore, changes in the lens thickness or changes in the curvature radius resulting from the movement of the measurement point in the horizontal or vertical direction of the lens (as shown in FIG. 11 and FIG. 12) may also be displayed in the form of a graph with the position of the measurement point plotted against the abscissa. Thus, FIG. 13 shows how the lens thickness t changes according to the movement of the measurement point, and FIG. 14 shows how the curvature radius changes. Such a display makes it possible to easily comprehend changes in the lens shape.

(2) Second Modified Embodiment

Figure 15A:
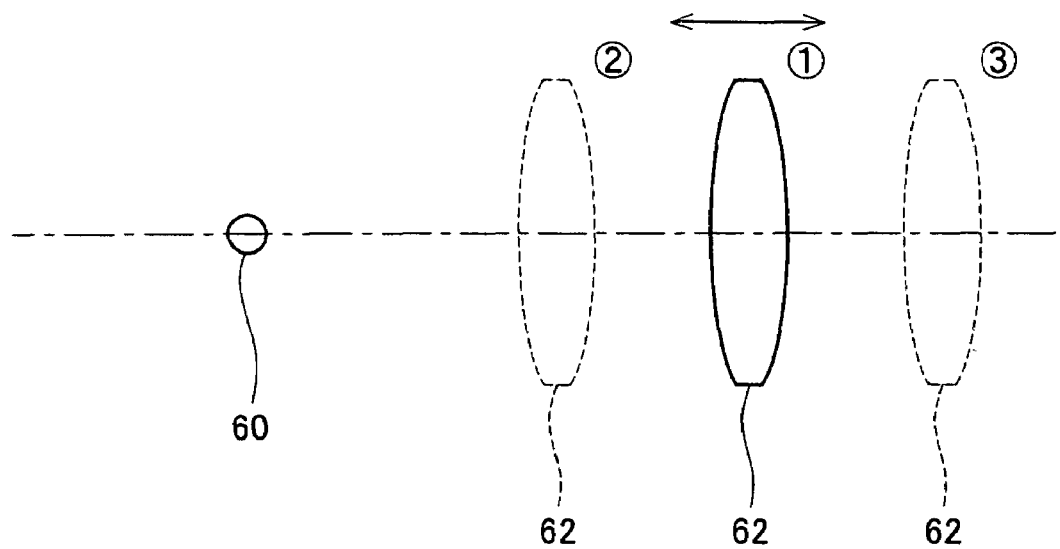
FIGS. 15a-15b schematically show configurations for projecting light at different angles of incidence on the lens.
Figure 15B:
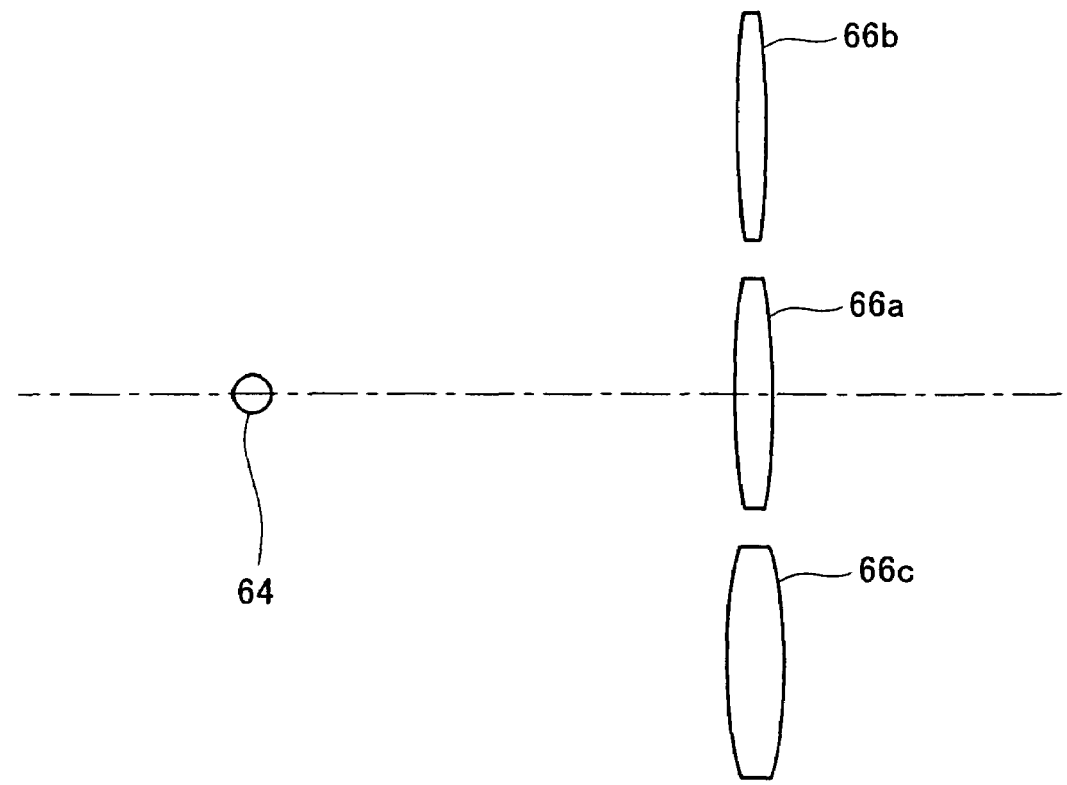

In the above illustrated representative embodiment, the angle of incidence (i.e., the angle of the light entering the lens to be inspected) is changed by moving the position of the light source in the optical axis direction; but the present teachings are not limited to this method. For example, as shown in FIG. 15a, it is also possible to fix light source 60 and to move condensing lens 62 disposed between light source 60 and the lens to be inspected in the optical axis direction (e.g., ①→③, ①→②). With such a method, too, the angle of incidence of the light entering the lens to be inspected can be changed. Further, as shown in FIG. 15b, a plurality of condensing lenses 66a, 66b, and 66c may be disposed between light source 64 and the lens to be inspected; and those condensing lenses 66a, 66b, and 66c may be selectively disposed on the optical axis.

Figure 16A:
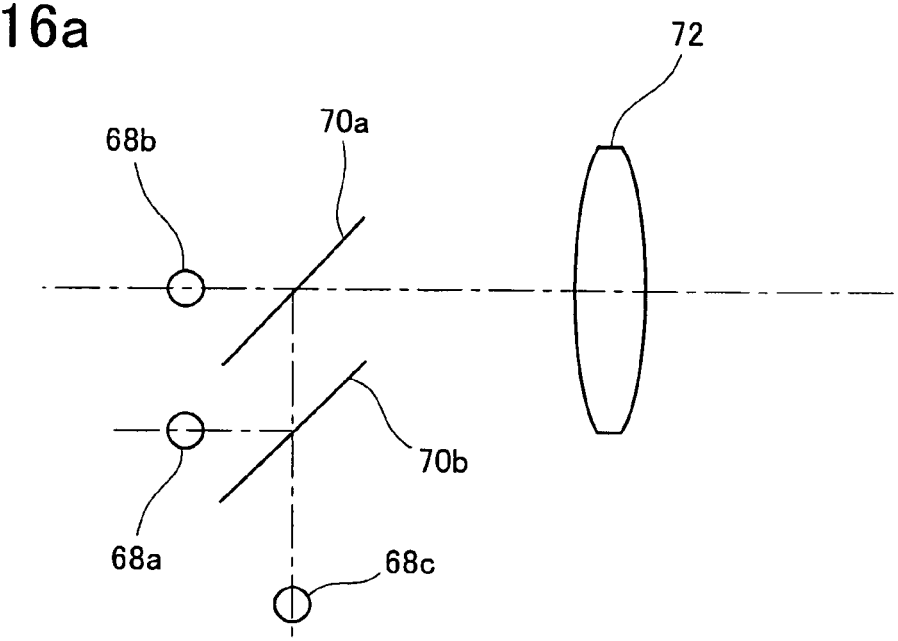
FIGS. 16a-16c schematically show other configurations for projecting light at different angles of incidence on the lens.
Figure 16B:
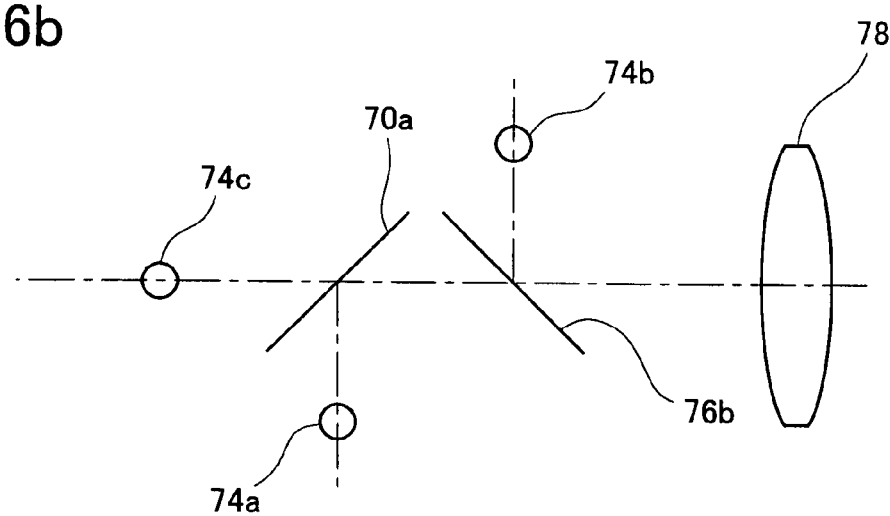
Figure 16C:
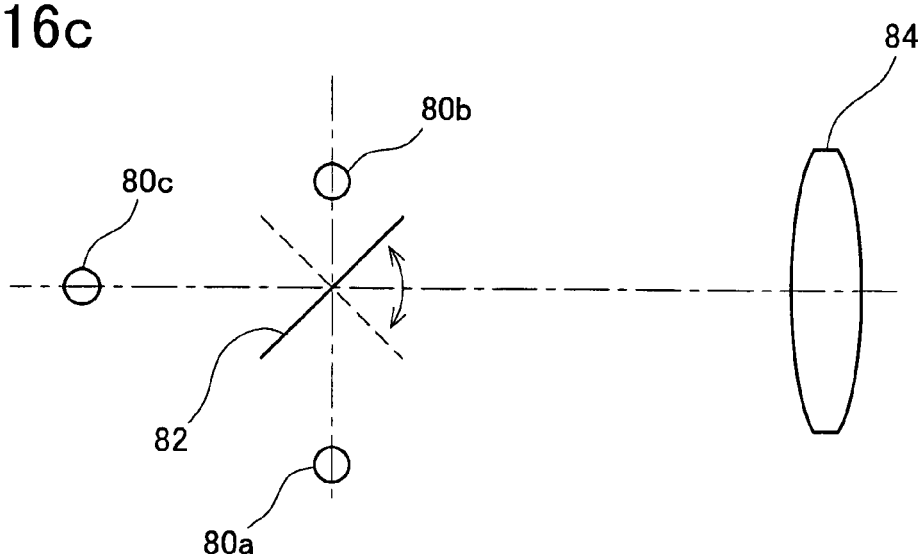

Alternatively, as shown in FIG. 16a, the incidence angle of the light entering the lens to be inspected may also be changed with three fixed light sources 68a, 68b, and 68c. Further, which of light sources 68a, 68b, and 68c will be used to illuminate the lens to be inspected can be selected by controlling two reflective mirrors 70a and 70b. When a plurality of light sources is used, a variety of variations can be selected for the arrangement of those light sources. For example, as shown in FIG. 16b, light sources 74a, 74b, and 74c can be disposed, or as shown in FIG. 16c, light sources 80a, 80b, and 80c can be disposed. The arrangement of light sources can be changed appropriately according to the arrangement space available inside the measurement device.

(3) Third Modified Embodiment

Figure 17:
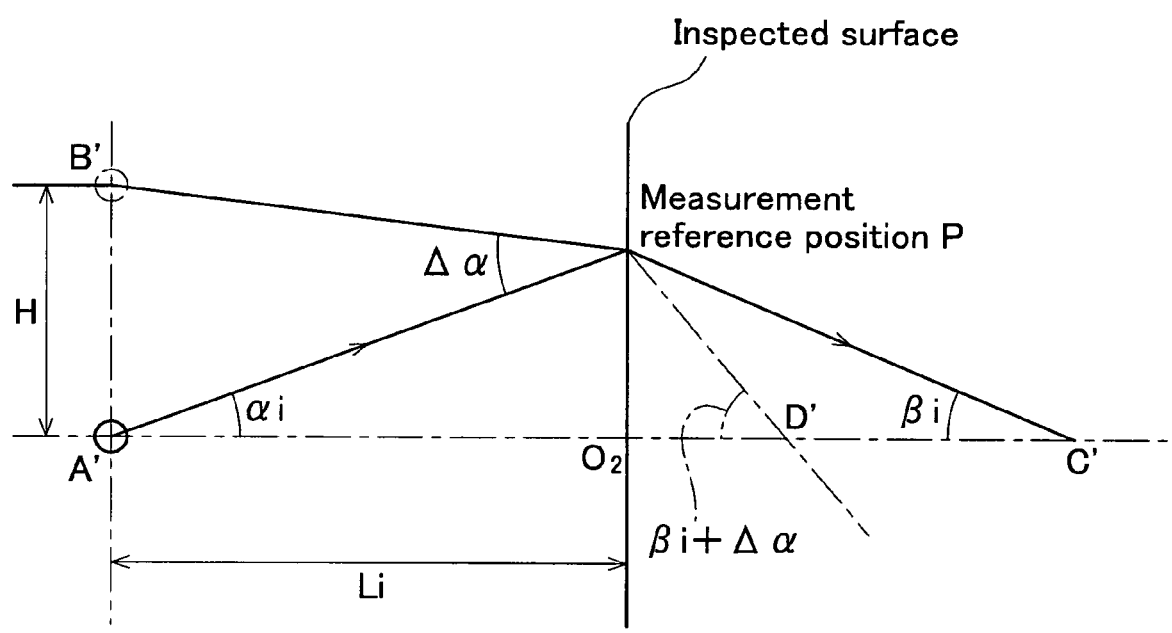
FIG. 17 is a diagram schematically showing a geometric relationship between the incident light and the transmitted light obtained when a light source was disposed in a position outside the optical axis of the measurement device.

In the above illustrated representative embodiment, the light source was positioned on the optical axis of the measurement device, but the light source may be also disposed at a location that is not on the optical axis of the measurement device. For example, as shown in FIG. 17, the light source may be disposed at point B', which is located at a distance H from the optical axis. In this case, the angle of incidence of the light entering the measurement reference position P is changed by Δα with respect to that obtained when the light source is disposed at point A' on the optical axis. However, the refractive angle of the transmitted light that has passed through the lens also assumes a value obtained by adding Δα to the refractive angle $\beta_i$ obtained when the light source is disposed at point A' on the optical axis. This Δα is determined by the distance $L_i$ from the light source to the surface to be inspected, and the distance H from the optical axis to the light source. Both of these values can be measured. Therefore, even if the light source is disposed at a position that is not on the optical axis of the measurement device, an equation similar to the above-described equation (2) can be derived from the "angle of incidence—degree of refraction" relationship. Therefore, in this embodiment, too, the fundamental data on the lens to be inspected can be calculated.

(4) Forth Modified Embodiment

In the above illustrated representative embodiment, a projection system was used as the measurement system for measuring the degree of refraction, but a coincidence system or image-forming system can be also employed as the measurement system for measuring the degree of refraction.

Finally, although the preferred representative embodiment has been described in detail, the present embodiment is for illustrative purpose only and not restrictive. It is to be understood that various changes and modifications may be made without departing from the spirit or scope of the appended claims. In addition, the additional features and aspects disclosed herein also may be utilized singularly or in combination with the above aspects and features.

The invention claimed is:

1. A method for measuring fundamental data of a lens, comprising the steps of:

illuminating a first measurement point of the lens with a first light at a first predetermined angle of incidence from a first surface side of the lens, measuring a first degree of refraction of the first transmitted light that passes through the lens from a second surface side of the lens;

illuminating the first measurement point with a second light at a second predetermined angle of incidence from the first surface side of the lens;

measuring a second degree of refraction of the second transmitted light that passes through the lens from the second surface side of the lens;

illuminating the first measurement point with a third light at a third predetermined angle of incidence from the first surface side of the lens;

measuring a third degree of refraction of the third transmitted light that passes through the lens from the second surface side of the lens;

illuminating a second measurement point with a fourth light at a fourth predetermined angle of incidence from the second surface side of the lens;

measuring a fourth degree of refraction of the fourth transmitted light that passes through the lens from the first surface side of the lens;

illuminating the second measurement point with a fifth light at a fifth predetermined angle of incidence from the second surface side of the lens;

measuring a fifth degree of refraction of the fifth transmitted light that passes through the lens from the first surface side of the lens;

illuminating the second measurement point with a sixth light at a sixth predetermined angle of incidence from the second surface side of the lens;

measuring a sixth degree of refraction of the sixth transmitted light that passes through the lens from the first surface side of the lens;

calculating a thickness of the lens, a focal distance of the first side surface of the lens, a focal distance of the second side surface of the lens, a focal distance of the lens, a curvature of radius of the first side surface of the lens, a curvature of radius of the second side surface of the lens and a refractive index of the lens based upon first, second, third, fourth, fifth and sixth "angle of incidence—degree of refraction" relationships; and outputting at least one of the calculated thickness of the lens, focal distance of the first side surface of the lens, focal distance of the second side surface of the lens, focal distance of the lens, curvature of radius of the first side surface, curvature of radius of the second side surface, and a refractive index of the lens.

2. A method for measuring fundamental data of a lens, comprising the steps of:

illuminating the lens with a light at a predetermined angle of incidence from a first surface side of the lens, measuring degree of refraction of the transmitted light that passes through the lens from a second surface side of the lens;

measuring a thickness of the lens;

calculating the fundamental data of the lens based upon a plurality of "angle of incidence—degree of refraction" relationships obtained by measuring the degree of refraction with respect to at least two different angles of incidence obtained for each of the two surfaces of the lens and the thickness of the lens; and outputting the calculated fundamental data of the lens.

3. A method for measuring fundamental data of a lens, comprising the steps of:

illuminating the lens with a light at a predetermined angle of incidence from a first surface side of the lens, measuring degree of refraction of the transmitted light that passes through the lens from a second surface side of the lens;

calculating the fundamental data of the lens based upon a plurality of "angle of incidence —degree of refraction" relationships obtained by measuring the degree of refraction with respect to a plurality of different angles of incidence; and outputting the calculated fundamental data of the lens;

wherein the calculating step comprises the steps of (1) representing the fundamental data of the lens as a function having a refractive index as a variable, based upon the "angle of incidence—degree of refraction" relationships relating to at least three different angles of incidence obtained for one surface of the lens, and (2) calculating the changes in the fundamental data at each measurement point by substituting appropriate numerical values for the refractive index.

4. A device for measuring the fundamental data of a lens, comprising:

means for illuminating a measurement point of the lens with light at a plurality of different angles of incidence from a first surface side of the lens;

means for detecting transmitted light that passes through the lens from a second surface side of the lens; and a processor in communication with the illuminating means and the detecting means, the detecting means communicating signals corresponding to the transmitted light to the processor, wherein the processor (1) causes illumination of the measurement point with the light from the illuminating means at the plurality of different angles of incidence, respectively, (2) calculates the respective degree of refraction of the transmitted light that passes through the lens based upon the output signal of the detecting means, and (3) calculates the fundamental data of the lens based upon a plurality of "angle of incidence—degree of refraction" relationships obtained for the plurality of different angles of incidence at the measurement point.

5. A measurement device as in claim 4, further comprising means for displaying the fundamental data calculated by the processor.

6. A measurement device as in claim 5, wherein the displaying means displays a graph showing the relationship between the movement of measurement points occurring when the measurement points are moved in the predetermined direction on the surface of the lens and the respective changes in the fundamental data.

7. A device for measuring the fundamental data of a lens, comprising:

means for illuminating the lens with light at a plurality of different angles of incidence;

means for detecting transmitted light that passes through the lens; and a processor in communication with the illuminating means and the detecting means, the detecting means communicating signals corresponding to the transmitted light to the processor, wherein the processor (1) causes illumination of the lens with the light from the illuminating means at the predetermined angle of incidence, (2) calculates the degree of refraction of the transmitted light that passes through the lens based upon the output signal of the detecting means, and (3) calculates the fundamental data of the lens based upon a plurality of "angle of incidence—degree of refraction" relationships obtained for a plurality of different angles of incidence;

wherein the illuminating means comprises a light source and a means for changing the optical distance between the light source and the lens.

8. A measurement device as in claim 7, wherein the changing means moves the light source in the axial direction, thereby changing the optical distance between the light source and the lens.

9. A measurement device as in claim 7, wherein the illuminating means further comprises a condensing lens disposed between the light source and the lens, wherein the changing means changes the position of the condensing lens in the axial direction, thereby changing the optical distance between the light source and the lens.

10. A measurement device as in claim 7, wherein the illuminating means further comprises a plurality of condensing lenses with different refractive powers, wherein the changing means selectively disposes any of the plurality of condensing lenses between the light source and the lens, thereby changing the optical distance between the light source and the lens.

11. A measurement device as in claim 4, wherein the illuminating means comprises a plurality of light sources disposed in a plurality of respective positions with different distances from the lens, and a reflective mirror for illuminating the lens with light from any of those light sources.

12. A measurement device as in claim 4, wherein the illuminating means illuminates the lens at no less than two of the three different types of illumination angles: divergent light, parallel light, and condensing light.

* * * * *